United States Patent [19]
Dexter et al.

[11] 3,969,383
[45] July 13, 1976

[54] FAT COMPOSITIONS STABILIZED WITH ESTERS OF FATTY ACIDS AND TERTIARY LOWER ALKYL SUBSTITUTED HYDROQUINONES AND METHOD THEREFROM

[75] Inventors: Martin Dexter, Briarcliff Manor; Janet B. Peterson, Yonkers, both of N.Y.

[73] Assignee: Ciba-Geigy Corporation, Ardsley, N.Y.

[22] Filed: Jan. 22, 1975

[21] Appl. No.: 543,084

Related U.S. Application Data

[60] Continuation of Ser. No. 431,179, Jan. 7, 1974, abandoned, which is a continuation of Ser. No. 129,123, March 29, 1971, abandoned, and a continuation-in-part of Ser. No. 847,390, Aug. 4, 1969, abandoned, which is a continuation-in-part of Ser. No. 590,549, Oct. 31, 1966, Pat. No. 3,459,704, which is a division of Ser. No. 224,602, Sept. 17, 1962, Pat. No. 3,294,836.

[52] U.S. Cl. .............................. 260/410.5; 252/404; 252/407
[51] Int. Cl.² .......................................... C09F 5/08
[58] Field of Search ........................ 260/410.5, 625; 252/404, 407

[56] References Cited
UNITED STATES PATENTS

| | | | |
|---|---|---|---|
| 2,215,142 | 9/1940 | Wolfe | 260/810 |
| 2,657,222 | 10/1953 | Allen | 260/396 |
| 2,679,459 | 5/1954 | Rosenwald | 260/410.5 |
| 2,908,718 | 10/1959 | Rosenwald | 260/613 |
| 3,116,305 | 12/1963 | Morris | 260/410.5 |

OTHER PUBLICATIONS

Aelony, J. Am. Oil Chemists Soc. vol. 32, pp. 170–172 (1955).

*Primary Examiner*—Patrick P. Garvin
*Assistant Examiner*—John F. Niebling
*Attorney, Agent, or Firm*—Nestor W. Shust

[57] ABSTRACT

Fats, especially edible oils of animal and vegetable origin, are stabilized against oxidative and/or thermal deterioration by addition of from 0.001% to about 0.1% by weight of a compound of the formula:

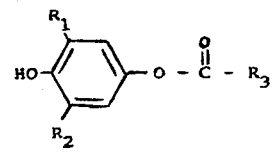

wherein $R_1$ is alkyl of 1 to 8 carbon atoms, $R_2$ is tertiary alkyl of 4 to 8 carbon atoms, and $R_3$ is alkyl of 11 to 21 carbon atoms. An example of the above stabilizer compound is 3-t-butyl-4-hydroxy-5-methylphenyl stearate.

6 Claims, No Drawings

FAT COMPOSITIONS STABILIZED WITH ESTERS OF FATTY ACIDS AND TERTIARY LOWER ALKYL SUBSTITUTED HYDROQUINONES AND METHOD THEREFROM

CROSS REFERENCES TO RELATED APPLICATIONS

This application is a continuation of Ser. No. 431,179 filed on Jan. 7, 1974, now abandoned, which is a continuation of Ser. No. 129,123, filed on Mar. 29, 1971, now abandoned and a continuation-in-part of our copending application Ser. No. 847,390, filed Aug. 4, 1969 now abandoned, which is a continuation-in-part of Ser. No. 590,549, filed Oct. 31, 1966, now U.S. Pat. No. 3,459,704, which is a divisional application of Ser. No. 224,602, filed Sept. 17, 1962, now U.S. Pat. No. 3,294,836.

Among the edible fats and oils which often become unfit for human consumption because of rancidity caused by oxidative and/or thermal deterioration which may be stabilized by incorporation of small amounts of the foregoing compounds are linseed oil, fish oils such as menhaden oil, cod liver oil, and castor oil, olive oil, rapeseed oil, coconut oil, palm oil, corn oil, sesame oil, peanut oil, safflower oil, sunflower oil, cotton seed oil, butter, fat, lard, beef tallow, and mixtures of the foregoing.

The esters of fatty acids having 12 to 22 carbon atoms and tertiary alkyl substituted hydroquinones are incorporated into the substrates to be stabilized in amounts of from about 0.001% to about 0.1% by weight. A preferred amount is from 0.01% to about 0.05%. An amount of approximately 0.02% is generally satisfactory. The stabilizer compound can be added to the substrate to be stabilized by dissolving or dispersing it directly in the substrate or by first dissolving the stabilizer in a food compatible solvent such as propylene glycol, glycerol monostearate and the like.

The esters of the above formula can be prepared by conventional methods known to those skilled in the art; for example, by the reaction of the appropriate acid chloride and substituted hydroquinone in a non-polar solvent such as benzene. A base such as pyridine may be used as an acid acceptor.

The starting materials are either commercially available or can be readily prepared by methods disclosed in the prior art.

EXAMPLE 1

3-t-butyl-4-hydroxy-5-methylphenyl stearate 6.5 g of 2-t-butyl-6-methylhydroquinone are dissolved in 65 ml of benzene under nitrogen and 2.85 g of pyridine are added. The solution is warmed to 45°C and 10.9 g of stearoyl chloride added. The reaction mixture is maintained at 45°–50°C while stirring for about 3 hours and then cooled to room temperature. 25 ml of benzene, 30 ml of ether and 50 ml of water are added and the mixture shaken in a separatory funnel. The benzene ether layer is then washed twice wth 30 ml portions of water and then dried over magnesium sulfate, filtered and the benzene-ether stripped in vacuo. The residue of 15.6 g was recrystallized twice from methanol and yielding 11.4 g of an off-white crystalline solid having a melting point of 64°–65.5°C.

EXAMPLE 2

3,5-di-t-butyl-4-hydroxyphenyl docosanate

The procedure of Example 1 is repeated except that 2,6-di-t-butylhydroquinone and docosanoyl chloride were employed to yield the above named product. It has a melting point of 59°–61°C.

EXAMPLE 3

3-t-octyl-4-hydroxy-5-methylphenyl arachidate

Following the general procedure of Example 1 using stoichiometrically equivalent amounts of 2-t-octyl-6methylhydroquinone and arachidoyl chloride, there is obtained 3-t-octyl-4-hydroxy-5-methylphenyl arachidate.

EXAMPLE 4

3-t-hexyl-4-hydroxy-5-methylphenyl laurate

Following the general procedure of Example 1 using stoichiometrically equivalent amounts of 2-t-hexyl-6-methylhydroquinone and lauroyl chloride, there is obtained 3-t-hexyl-4-hydroxy-5-methylphenyl laurate.

EXAMPLE 5

3-t-butyl-4-hydroxy-5-methylphenyl palmitate

Again repeating the procedure of Example 1, substituting a stoichiometrically equivalent amount of palmitoyl chloride in lieu of stearoyl chloride, there is obtained 3-t-butyl-4-hydroxy-5-methylphenyl palmitate.

EXAMPLE 6

3,5-di-t-butyl-4-hydroxyphenyl stearate

Repeating the procedure of Example 1 and using a stoichiometrically equivalent amount of 2,6-di-t-butylhydroquinone in place of 2-t-butyl-6-methylhydroquinone, 3,5-di-t-butyl-4-hydroxyphenyl stearate was obtained. The melting point was 35°–39°C.

EXAMPLE 7

3-butyl-4-hydroxyphenyl stearate

Example 1 is repeated employing a stoichiometrically equivalent amount of 2-t-butylhydroquinone in place of 2-t-butyl-6-methylhydroquinone, and there is obtained 3-t-butyl-4-hydroxyphenyl stearate.

EXAMPLE 8

An unstabilized blend of soybean oil and cotton seed oil (unstabilized Wesson Oil) is stabilized with an ester stabilizer of the present invention and tested as follows. To 60 g of the unstabilized oil, there is added 0.02% by weight of powdered 3-t-butyl-4-hydroxy-5-methylphenyl stearate. The oil is heated to 375°F in a silicone oil bath and 1 g of water added via saturated boiling chips or glass wool to minimize bumping. Samples of the oil are withdrawn periodically at 5, 25, 40, 50, 65 and 75 hours and the refractive index measured and the color assessed using the Gardner Color Scale. Each time a sample is removed, 1 g of water is added. The refractive index is measured on a Bausch and Lomb refractometer using the method according to Arya et al*. The sample of oil containing the stabilizer of the present invention, even after 75 hours of testing is only slightly deteriorated in contrast to the unstabilized sample which is almost unuseable. Similarly fats containing 0.02% of the compounds of Examples 2, 3, 4, 5, and 6 respectively are also stabilized in the same manner. *

Arya et al, ss., S. Ramanujam, and P. K. Vigayaraghavan, Refractive Index as an Objective Method for Evaluation of Rancidity in Edible Oils and Fats. J. Am. Oil Chem. Soc., Vol. 46, pages 28–30, 1969.

What is claimed is:

1. A compound of the formula:

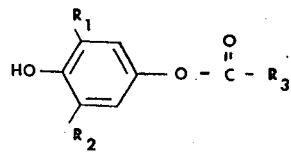

wherein
$R_1$ is an alkyl of 1 to 8 carbon atoms;
$R_2$ is a tertiary alkyl of 4 to 8 carbon atoms; and
$R_3$ is alkyl of 11 to 21 carbon atoms.

2. A compound as claimed in claim 1 wherein $R_2$ is tertiary butyl.

3. A compound of 1 which 1which is 3-t-butyl-4-hydroxy-5-methylphenyl stearate.

4. A compound of claim 1 which is 3,5-di-t-butyl-4-hydroxyphenyl docosanate.

5. A compound of claim 1 which is 3,5-di-t-butyl-4-hydroxyphenyl stearate.

6. A compound of claim 1 wherein $R_3$ is alkyl group of 11 carbon atoms.

* * * * *